US006738397B2

(12) United States Patent
Yamamoto et al.

(10) Patent No.: US 6,738,397 B2
(45) Date of Patent: May 18, 2004

(54) SOLID-STATE LIGHT SOURCE APPARATUS (75) Inventors: Shuhei Yamamoto, Tokyo (JP); Yoshihito Hirano, Tokyo (JP); Ichiro Shoji, Aichi (JP); Takunori Taira, Aichi (JP); Sunao Kurimura, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/121,705

(22) Filed: Apr. 15, 2002

(65) Prior Publication Data
US 2002/0158260 A1 Oct. 31, 2002

(30) Foreign Application Priority Data

Apr. 27, 2001 (JP) ........................................ 2001-131953
Nov. 7, 2001 (JP) ........................................ 2001-341797

(51) Int. Cl.[7] .............................. H01S 3/10; G02F 1/03
(52) U.S. Cl. ............................ 372/21; 372/28; 359/248
(58) Field of Search ........................ 372/21, 28, 29.011, 372/38.06, 22, 20, 211; 359/248

(56) References Cited

U.S. PATENT DOCUMENTS

| | | |
|---|---|---|
| 3,410,625 A | 11/1968 | Edwards |
| 3,853,386 A | 12/1974 | Ritter |
| 3,885,855 A | 5/1975 | Gross |
| 3,889,026 A | 6/1975 | Groth |
| 3,901,997 A | 8/1975 | Groth |
| 3,914,023 A | 10/1975 | Thelen |
| 3,978,273 A | 8/1976 | Groth |
| 4,179,181 A | 12/1979 | Chang |
| 4,189,205 A | 2/1980 | Vandehei |
| 4,229,066 A | 10/1980 | Rancourt |
| 4,240,696 A | 12/1980 | Tracy |
| 4,269,481 A * | 5/1981 | Yeh et al. .................... 359/259 |
| 4,441,789 A * | 4/1984 | Pohlack ...................... 359/588 |
| 4,488,775 A | 12/1984 | Yamamoto |
| 4,525,687 A | 6/1985 | Chemia |
| 4,556,277 A | 12/1985 | Fan |
| 4,590,118 A | 5/1986 | Yatabe |
| 4,726,655 A | 2/1988 | Mahlein |
| 4,756,602 A | 7/1988 | Southwell |
| 4,770,496 A | 9/1988 | Mahlein |
| 4,773,717 A | 9/1988 | Pai |
| 4,838,648 A | 6/1989 | Phillips |
| 4,846,551 A | 7/1989 | Rancourt |

(List continued on next page.)

OTHER PUBLICATIONS

"61th Applied Physics Congress Academic Lecture, Lecture preliminary report collection No. 3, 4a–L–8, p957; 2000" with its English summary.
"Laser Review" vol. 26 No. 7 p. 522–526, Jul., 1998.
"Laser Review" vol. 26 No. 7 p. 527–530, Jul., 1998.

Primary Examiner—Paul Ip
Assistant Examiner—Philip Nguyen
(74) Attorney, Agent, or Firm—Birch, Stewart, Kolasch & Birch, LLP (57) ABSTRACT

A solid-state light source apparatus includes a first excitation laser light source for outputting a laser beam of a first wavelength, a second excitation laser light source for outputting a laser beam of a second wavelength, a difference frequency between the laser beam of the first wavelength and the laser beam of the second wavelength being in a terahertz band, and a semiconductor pseudo phase matching device which is disposed at a place where a first optical axis of the laser beam of the first wavelength overlaps with a second optical axis of the laser beam of the second wavelength, and generates a terahertz beam in a direction coaxial with the first and second optical axes on the basis of irradiation of the laser beams of the first and second wavelengths. Thus, high output and high efficiency terahertz wave generation can be easily and certainly realized while a narrow line width characteristic is maintained.

17 Claims, 5 Drawing Sheets

U.S. PATENT DOCUMENTS

| Patent | | Date | Inventor | Ref |
|---|---|---|---|---|
| 4,915,494 | A | 4/1990 | Shipley | |
| 5,035,485 | A | 7/1991 | Kageyama | |
| 5,071,206 | A | 12/1991 | Hood | |
| 5,111,329 | A | 5/1992 | Gajewski | |
| 5,119,232 | A | 6/1992 | Daley | |
| 5,148,504 | A | 9/1992 | Levi | |
| 5,170,290 | A | 12/1992 | Land | |
| 5,179,468 | A | 1/1993 | Gasioli | |
| 5,187,461 | A | 2/1993 | Brommer | |
| 5,212,584 | A | 5/1993 | Chung | |
| 5,225,930 | A | 7/1993 | Land | |
| 5,233,464 | A | 8/1993 | Costich | |
| 5,239,406 | A | 8/1993 | Lynam | |
| 5,247,528 | A * | 9/1993 | Shinozaki et al. | 372/22 |
| 5,262,894 | A | 11/1993 | Wheatley | |
| 5,268,785 | A | 12/1993 | Crenshaw | |
| 5,302,449 | A | 4/1994 | Eby | |
| 5,315,430 | A | 5/1994 | Brennan | |
| 5,315,437 | A | 5/1994 | Alfaso | |
| 5,337,183 | A | 8/1994 | Rosneblatt | |
| 5,345,328 | A | 9/1994 | Fritz | |
| 5,355,245 | A | 10/1994 | Lynam | |
| 5,372,874 | A | 12/1994 | Dickey | |
| 5,406,573 | A | 4/1995 | Ozbay | |
| 5,424,559 | A | 6/1995 | Kasahara | |
| 5,433,988 | A | 7/1995 | Fukuda | |
| 5,436,757 | A * | 7/1995 | Okazaki et al. | 359/332 |
| 5,440,421 | A | 8/1995 | Fan | |
| 5,448,404 | A | 9/1995 | Shrenk | |
| 5,457,570 | A | 10/1995 | Lu | |
| 5,471,180 | A | 11/1995 | Brommer | |
| 5,480,722 | A | 1/1996 | Tomonaga | |
| 5,493,442 | A | 2/1996 | Buchholz | |
| 5,506,037 | A | 4/1996 | Termath | |
| 5,506,919 | A | 4/1996 | Roberts | |
| 5,513,039 | A | 4/1996 | Lu | |
| 5,514,476 | A | 5/1996 | Hartig | |
| 5,552,882 | A | 9/1996 | Lyons | |
| 5,557,462 | A | 9/1996 | Hartig | |
| 5,559,825 | A * | 9/1996 | Scalora et al. | 372/96 |
| 5,563,734 | A | 10/1996 | Wolfe | |
| 5,591,529 | A | 1/1997 | Braatz | |
| 5,595,825 | A | 1/1997 | Guiselin | |
| 5,615,289 | A | 3/1997 | Duck | |
| 5,668,578 | A * | 9/1997 | Nihei et al. | 346/74.3 |
| 5,677,921 | A * | 10/1997 | Schaffers et al. | 372/41 |
| 5,740,287 | A | 4/1998 | Scalora | |
| 5,744,073 | A * | 4/1998 | Nihei et al. | 264/1.21 |
| 5,751,466 | A * | 5/1998 | Dowling et al. | 359/248 |
| 5,796,902 | A | 8/1998 | Bhat | |
| 5,801,378 | A | 9/1998 | Hane | |
| 5,812,318 | A * | 9/1998 | Babbitt et al. | 359/559 |
| 5,866,896 | A * | 2/1999 | Georgiades et al. | 250/201.1 |
| 5,907,427 | A * | 5/1999 | Scalora et al. | 359/248 |
| 5,909,035 | A | 6/1999 | Kim | |
| 6,028,693 | A * | 2/2000 | Fork et al. | 359/248 |
| 6,144,679 | A * | 11/2000 | Herman et al. | 372/21 |
| 2001/0028029 | A1 * | 10/2001 | Scalora et al. | 250/216 |

* cited by examiner

SOLID-STATE LIGHT SOURCE APPARATUS

This application is based on Application No. 2001-131953, filed in Japan on Apr. 27, 2001 and Application No. 2001-341797, filed in Japan on Nov. 7, 2001, the contents of which are hereby incorporated by reference.

BACKGROUND OF THE INVENTION

1. Field of the Invention

The present invention relates to a solid-state light source apparatus, and particularly to a solid-state light source apparatus used for a terahertz band spectroscopic light source, an imaging light source, a light source for communication, and a light source for measurement.

2. Description of the Related Art

As a light source for generating a terahertz band beam, although there was a GaAs photoconductive device, a magnetic field application type semiconductor device, an optical parametric oscillator using $LiNbO_3$, a difference frequency generation device using an organic nonlinear optical crystal, or the like, all of them had low efficiency and low output power.

Since a conventional semiconductor pseudo phase matching device using diffused junction has high scattering at a junction interface, it falls far short of practical use, and naturally, there was no terahertz light source using this technique.

Figure 5:
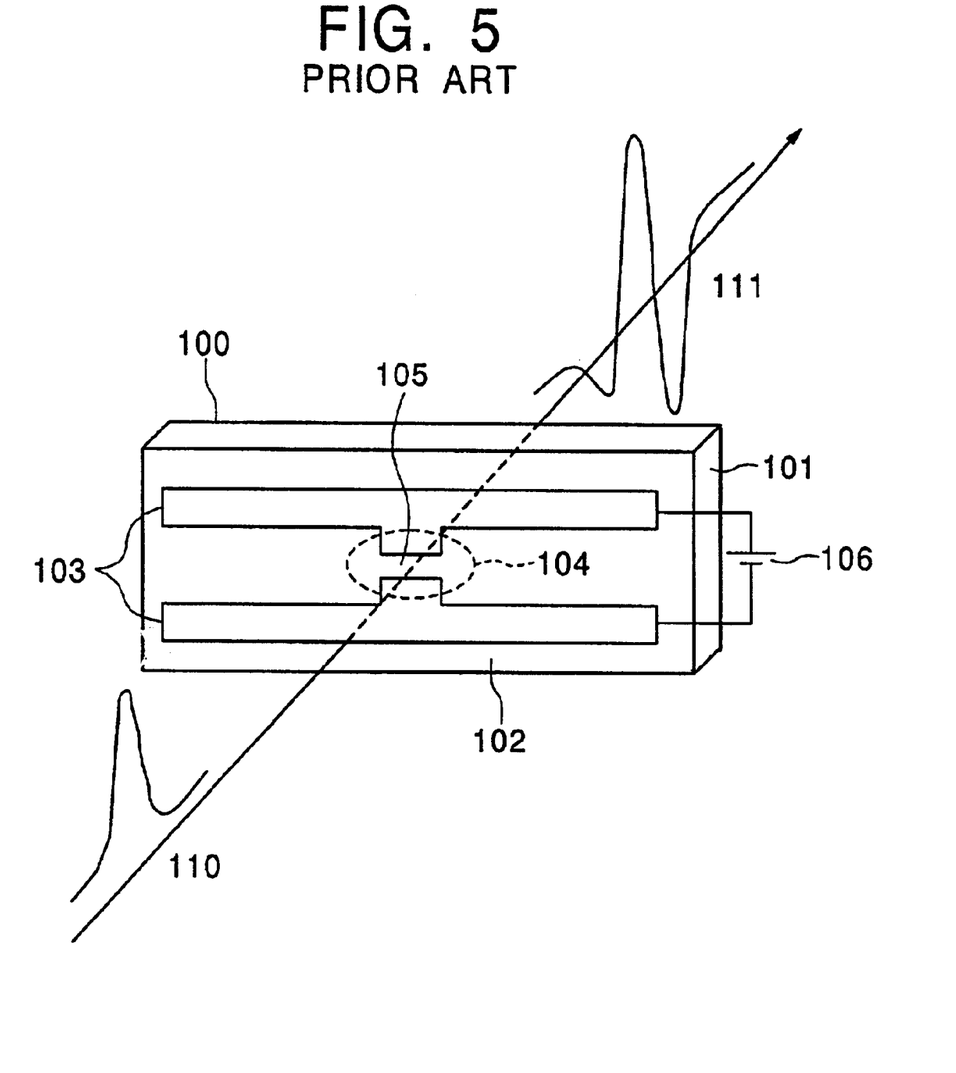
FIG. 5 is a view showing the structure of a conventional solid-state light source apparatus.

A conventional solid-state light source apparatus will be described with reference to the drawing. FIG. 5 is a view showing the structure of a conventional solid-state light source apparatus disclosed in, for example, "Laser Research, Vol. 26, No. 7, p. 515 to 521, July 1998". FIG. 5 is the structural view of an example of a photoconductive device used for terahertz wave generation.

In FIG. 5, reference numeral 100 designates a photoconductive device; 101, a semiconductor substrate; 102, a photoconductive thin film; 103, parallel transmission lines; 104, a dipole antenna; 105, a gap; 106, a direct current power source; 110, an optical pulse; and 111, a terahertz electromagnetic wave., In this photoconductive device 100, the parallel transmission lines 103 made of transmission lines 103a and 103b are formed on the substrate 101 of a high speed response semiconductor such as GaAs and the photoconductive thin film 102 of low temperature growth GaAs or the like, and a single optical switch made of the minute dipole antenna 104 is provided at the center portion.

The minute gap 105 with several $\mu m$, for example, exists at the center of the optical switch 104, and a suitable voltage is applied to the gap 105 by the direct current power source 106.

When a laser beam having energy higher than the band gap of the semiconductor enters on the gap 105 as the optical pulse 110, free carriers are generated in the semiconductor, a pulse-like current flows, and the terahertz electromagnetic wave 111 in proportion to the time differential of the pulse-like current is generated.

Thus, the terahertz electromagnetic wave 111 is generated when the pulse-like current is, for example, on a picosecond level or less, and further, it is generated when a short pulse laser beam in which the optical pulse 110 is on a picosecond level or less is irradiated.

As disclosed in "Laser Society Scientific Lecture Meeting, 17th Annual Conference, 23aII4, p. 194 to 197", two continuous-wave laser beams are optically mixed with each other on a photoconductive device, so that a terahertz wave can be continuously generated. When two monochromatic beams with different frequencies are mixed, a resultant amplitude is modulated by a difference frequency. When the mixed wave (light beat) is irradiated to the photoconductive device, a photocurrent is modulated, and an electromagnetic wave corresponding to the difference frequency is radiated from an antenna. Thus, when the frequencies of the two continuous-wave laser beams are adopted so that the difference frequency becomes about terahertz, the terahertz wave is generated.

As disclosed in "Laser Research, Vol. 26, No. 7, p. 527 to 530, July 1998", when a light pulse of picosecond or less as a laser beam is irradiated to a semiconductor such as InAs or GaAs put in a magnetic field, a terahertz wave can be generated.

Further, as disclosed in "Laser Research, Vol. 26, No. 7, p. 522 to 526, July 1998", $LiNbO_3$ is used as a crystal having a secondary nonlinear optical effect, and light waves are caused to enter upon the crystal, and an optical parametric oscillator is constructed under phase matching conditions, so that a terahertz beam can be generated.

As disclosed in "OPTICS LETTERS, Vol. 25, No. 23, pp. 1714–1716, 2000", an organic crystal with high nonlinearity is used as a crystal having a secondary nonlinear optical effect, two laser beams with a difference frequency of terahertz enters upon the crystal, and difference frequency generation is carried out under phase matching conditions, so that a terahertz beam can be generated.

Further, as disclosed in "61th Applied Physics Society Scientific Lecture Meeting, Collection of Lecture Preparatory Papers, No. 3, 4a-L-8, p957, 2000", a bulk type semiconductor material is used as a material having a secondary nonlinear optical effect, two laser beams with a difference frequency of terahertz are caused to enter on the nonlinear material, and difference frequency generation is carried out under phase matching conditions, so that a terahertz beam can be generated.

However, the foregoing prior art had problems as follows:

In the generation of the terahertz beam by the photoconductive device using the excitation of the short pulse laser beam, the efficiency was low and the output power was low. Further, since the line width was wide, a light source of a single longitudinal mode did not exist as well.

In the generation of the terahertz beam by the photoconductive device using the excitation of the two continuous-wave laser beams, the efficiency was low and the output power was low.

In the generation of the terahertz beam by the semiconductor device put in the magnetic field using the excitation of the short pulse laser beam, the efficiency was low and the output power was low. Besides, since the line width is wide, a light source of a single longitudinal mode did not exist as well.

In the generation of the terahertz beam by the optical parametric oscillator using $LiNbO_3$ as the nonlinear optical device, the absorption of the terahertz beam in $LiNbO_3$ was large, the extraction efficiency of the generated terahertz beam was low, and the output power was low. Further, since the output angle of the terahertz beam was not coincident with the optical axis of the exciting beam, in the optical parametric oscillator, it was difficult to take a long interaction length between the exciting beam and the terahertz beam obtained by wavelength conversion, and the wavelength conversion had low efficiency and the output power was low.

In the generation of the terahertz beam by the difference frequency using the organic crystal as the nonlinear optical device, the efficiency was low and the output power was low.

Besides, in the generation of the terahertz beam by the difference frequency using the bulk type semiconductor material as the linear optical device, since it was difficult to take a long distance in the phase matching conditions, the efficiency was low and the output power was low.

Moreover, in the conventional semiconductor pseudo phase matching device using diffused junction, there were also problems that since scattering at the junction interface was high, it falls far short of practical use, and naturally, there was no terahertz beam source using this technique.

SUMMARY OF THE INVENTION

The present invention has been made to solve the foregoing problems, and a pseudo phase matching difference frequency generation device by diffused junction of semiconductors is used to generate a terahertz wave. Since the semiconductor such as GaP or GaAs has a large nonlinear optical constant, it is suitable for high efficiency wavelength conversion, and is transparent in a terahertz region. Further, the semiconductor has large thermal conductivity and is also suitable for high power operation. Further, when a tunable laser of a band of 1 $\mu$m is used as a difference frequency light source, a diffused junction period for generating the terahertz wave by pseudo phase matching difference frequency generation is very long, for example, several mm, and the number of junction interfaces can be suppressed to the minimum, so that a low-loss device can be fabricated. Further, an object of the invention is to provide a terahertz wave light source which can tune a terahertz generation wavelength over several hundred up by merely adjusting device temperature and changing the wavelength of one of the difference frequency light sources slightly by the order of nm.

According to a first aspect of the invention, a solid-state light source apparatus includes a first excitation laser light source for outputting a laser beam of a first wavelength, a second excitation laser light source for outputting a laser beam of a second wavelength, a difference frequency between the laser beam of the first wavelength and the laser beam of the second wavelength being in a terahertz band, and a nonlinear wavelength conversion device which is disposed at a place where a first optical axis of the laser beam of the first wavelength overlaps with a second optical axis of the laser beam of the second wavelength, and generates a terahertz beam in a direction coaxial with the first and second optical axes on the basis of irradiation of the laser beams of the first and second wavelengths.

A solid-state light source apparatus according to a second aspect of the invention is such that the first excitation laser light source is a fixed wavelength laser, and the second excitation laser light source is a tunable wavelength laser.

A solid-state light source apparatus according to a third aspect of the invention is such that the first excitation laser light source is a Nd:YAG laser, and the second excitation laser light source is a Yb:YAG laser.

A solid-state light source apparatus according to a fourth aspect of the invention is such that the first excitation laser light source outputs a monochromatic beam of the first wavelength of 1.064 $\mu$m and the second excitation laser light source outputs a monochromatic beam of the second wavelength in a band of 1 $\mu$m.

A solid-state light source apparatus according to a fifth aspect of the invention is such that the first and second excitation laser light sources are Yb:YAG lasers.

A solid-state light source apparatus according to a sixth aspect of the invention is such that the first excitation laser light source is a Nd:YLF laser, and the second excitation laser light source is a Yb:YAG laser.

A solid-state light source apparatus according to a seventh aspect of the invention is such that the nonlinear wavelength conversion device is a semiconductor pseudo phase matching device in which a plurality of first semiconductor materials each having a length of $\Lambda/2$ in a direction coaxial with the first and second optical axes and a plurality of second semiconductor materials each having a length of $\Lambda/2$ are united with one another by diffused junction, and the first and second semiconductor materials are disposed so that directions vertical to the first and second optical axes are [001] axes, directions of the respective [001] axes are parallel to one another, and the directions of the [001] axes are alternately inverted.

A solid-state light source apparatus according to an eighth aspect of the invention is such that the first and the second semiconductor materials of the semiconductor pseudo phase matching device are transparent materials in a terahertz region.

A solid-state light source apparatus according to a ninth aspect of the invention is such that the first and the second semiconductor materials of the semiconductor pseudo phase matching device are made of GaP.

A solid-state light source apparatus according to a tenth aspect of the invention is such that the first and the second semiconductor materials of the semiconductor pseudo phase matching device are made of GaAs.

A solid-state light source apparatus according to an eleventh aspect of the present invention is such that the nonlinear wavelength conversion device is a semiconductor pseudo phase matching device in which a plurality of first semiconductor materials each having a length of $\Lambda/2$ in a direction coaxial with the first and second optical axes and a plurality of second semiconductor materials each having a length of $\Lambda/2$ are united with one another by diffused junction, and the first and second semiconductor materials are disposed so that azimuths of the first and second semiconductor materials are the same as a direction perpendicular to the first and second optical axes and directions thereof are alternately inverted.

A solid-state light source apparatus according to a twelfth aspect of the present invention is such that the first and second semiconductor materials of the semiconductor pseudo phase matching device are transparent materials in a terahertz region.

A solid-state light source apparatus according to a thirteenth aspect of the present invention is such that the first and second semiconductor materials of the semiconductor pseudo phase matching device are GaP.

A solid-state light source apparatus according to a fourteenth aspect of the present invention is such that the first and second semiconductor materials of the semiconductor pseudo phase matching device are GaAs.

DETAILED DESCRIPTION OF THE PREFERRED EMBODIMENTS

Embodiment 1

Figure 1:
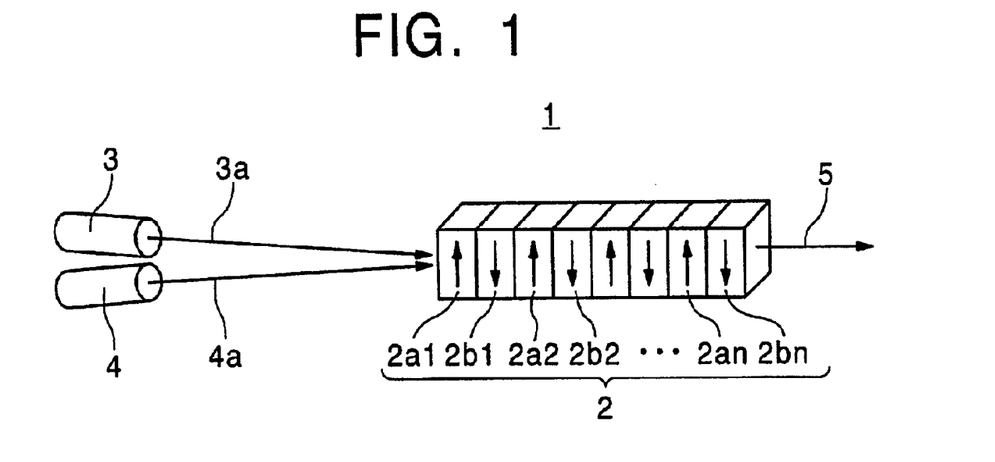
FIG. 1 is a view showing the structure of a solid-state light source apparatus according to embodiment 1 of the present invention.

A solid-state light source apparatus according to embodiment 1 of the present invention will be described with reference to the drawings. FIG. 1 is a view showing the structure of the solid-state light source apparatus according to the embodiment 1 of the invention. FIG. 1 shows a structural example of the solid-state light source apparatus as a terahertz wave light source using pseudo phase matching nonlinear wavelength conversion.

In FIG. 1, reference symbol 1 denotes a solid-state light source apparatus as a terahertz wave light source using pseudo phase matching nonlinear wavelength conversion; 2, a semiconductor pseudo phase matching device as a nonlinear wavelength conversion device; 3, a first excitation laser light source; 3a, a laser beam of a wavelength $\lambda 1$; 4, a second excitation laser light source; 4a, a laser beam of a wavelength $\lambda 2$; and 5, a terahertz beam of a wavelength $\lambda 3$.

Next, the operation of the solid-state light source apparatus according to the embodiment 1 will be described with reference to the drawings.

The first excitation laser light source 3 outputs the laser beam 3a of the wavelength $\lambda 1$, and the second excitation laser light source 4 outputs the laser beam 4a of the wavelength $\lambda 2$. The first laser light source 3 may be a Nd:YAG laser, and the second laser light source 4 may be a Yb:YAG laser.

Thus, the first excitation laser light source 3 is a fixed wavelength laser for outputting such monochromatic light that the wavelength $\lambda 1$ of the laser beam 3a is 1.064 $\mu$m. Since the Yb:YAG laser has a wide band gain in the 1 $\mu$m band, it can be constructed as a tunable wavelength laser, and the second excitation laser light source 4 is a tunable wavelength laser for outputting such monochromatic light that the wavelength $\lambda 2$ of the laser beam 4a is in the 1 $\mu$m band. Incidentally, since the first laser light source 3 uses the transition from R2 to Y3 among transitions from 4F3/2 to 4I11/2, it becomes the fixed wavelength laser of a wavelength of 1.064 $\mu$m. However, the first laser light source may be made a fixed wavelength laser for outputting a laser beam of another oscillation wavelength using another transition.

Both the laser beam 3a from the first excitation laser light source 3 and the laser beam 4a from the second excitation laser light source 4 are irradiated to the semiconductor pseudo phase matching device 2. Although it is desirable to coaxially arrange the optical axes of the laser beam 3a and the laser beam 4a, they may have a slight angle from the relation between the size of the first excitation laser light source 3 and the size of the second excitation laser light source 4. However, in this case, the optical axes of the laser beam 3a and the laser beam 4a are almost coincident with each other on the semiconductor pseudo phase matching device 2. The optical axes of the laser beam 3a and the laser beam 4a may be made coincident with each other in advance by suitable optical parts.

In the semiconductor pseudo phase matching device 2, a plurality of semiconductor materials $2an$ (n=1, 2, ..., n) and $2bn$ (n=1, 2, ..., n) each having a length of $\Lambda/2$ in a direction coaxial with the optical axis of excitation beam are united with one another by diffused junction. The first and second semiconductor materials are arranged so that the azimuths of the first and second semiconductor materials are the same as a direction perpendicular to the first and second optical axes and the directions thereof are alternately inverted. Here, as to the azimuths of the first and second semiconductor materials, in the case where directions perpendicular to the first and second optical axes are the [001] axes, the directions of the respective [001] axes are arranged so as to be directed parallel to one another and be alternately inverted, it becomes possible to obtain the largest nonlinear optical constant in the semiconductor materials. Therefore, in this embodiment, there is shown a case where the directions perpendicular to the first and second optical axes are the [001] axes.

Both the laser beam 3a from the first excitation laser light source 3 and the laser beam 4a from the second excitation laser light source 4 are linearly polarized lights. In the case where the wavelength of the laser beam 3a is shorter than the wavelength of the laser beam 4a, the polarization direction of the laser beam 3a is parallel to the directions of the [001] axes of the semiconductor materials and the polarization direction of the laser beam 4a is perpendicular to the directions of the [001] axes. Also, in the case where the wavelength of the laser beam 3a is longer than the wavelength of the laser beam 4a, the polarization direction of the laser beam 3a is perpendicular to the directions of the [001] axes and the polarization direction of the laser beam 4a is parallel to the directions of the [001] axes.

In the case where difference frequency generation is carried out using excitation laser beams of two wavelengths and a nonlinear wavelength conversion device, the following relational expression is established.

$$\omega 1 - \omega 2 = \omega 3, \omega = c/\lambda \tag{1}$$

Where, $\omega$ is a frequency, c is the speed of light, and $\lambda$ is a wavelength.

Figure 2:
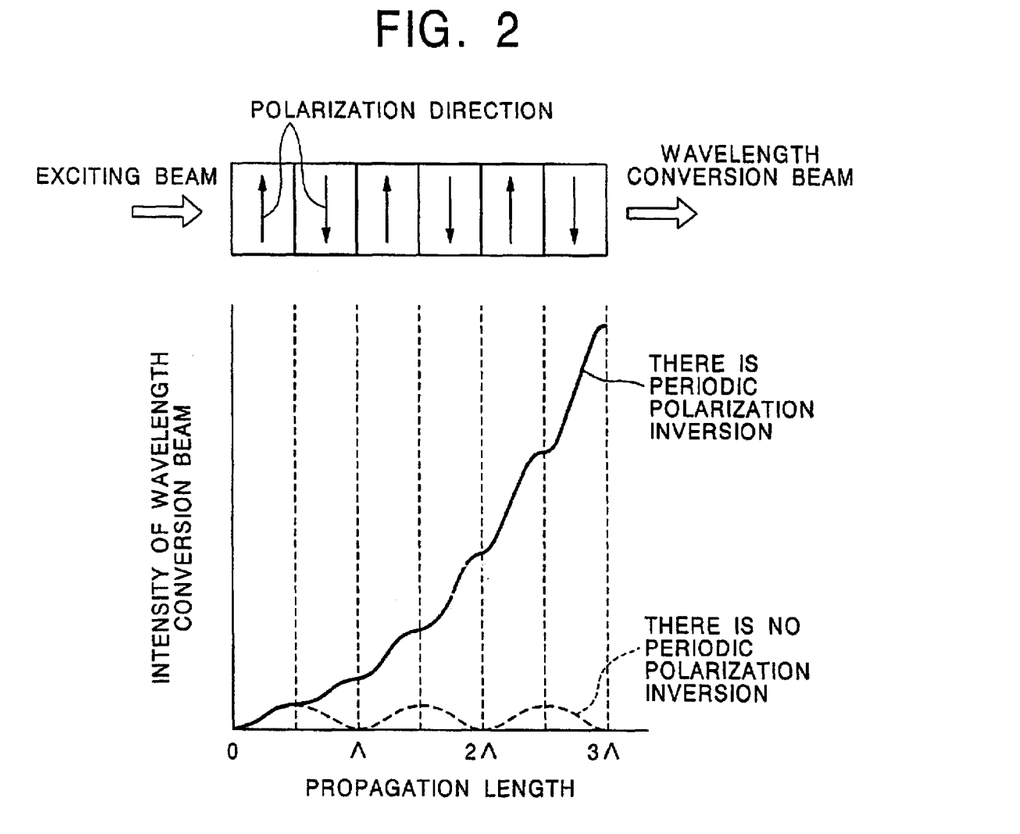
FIG. 2 is a schematic view showing wavelength conversion light intensity in a nonlinear wavelength conversion device.

FIG. 2 is a schematic view showing wavelength conversion beam intensity with respect to propagation length of a laser beam in a nonlinear wavelength conversion device.

When the difference in wave numbers between double wavelength excitation laser beam and difference frequency beam is referred to as $\Delta k$, the coherence length is referred to as lc, and the inversion period is referred to as $\Lambda$, the following relation is established.

$$\Delta k = k1 - k2 - k3, k = 2\pi n/\lambda \tag{2}$$

$$lc = 2\pi/\Delta k \tag{3}$$

$$\Lambda = 2lc = 2\pi/\Delta k$$

Where, n is refractivity of a nonlinear wavelength conversion device with respect to a wavelength $\lambda$.

In the case where the nonlinear wavelength conversion device of one bulk-type device is used, the wavelength conversion beam intensity is saturated and becomes a maximum when the propagation length is lc, and then, it is lowered. When the propagation length is 2lc, although the wavelength conversion beam intensity becomes 0, it is again increased till the propagation length becomes 3lc. Like so, since the wavelength conversion beam is propagated through the nonlinear wavelength conversion device while the intensity thereof repeatedly increases and decreases, it is difficult to obtain a high output beam.

On the other hand, in the case of the pseudo phase matching device 2 in which the polarization direction of the nonlinear wavelength conversion device is inverted every coherence length 1c, the wavelength conversion beam intensity can be increased without repeating the increase and decrease every propagation length 1c.

For example, in the case of LiNbO$_3$, and in the case where the pseudo phase matching wavelength conversion device is formed in which the polarization direction is inverted every coherence length 1c, it can also be formed by the application of a high electric field to LiNbO$_3$. On the other hand, in the case of a semiconductor material such as GaP or GaAs, since it is difficult to form the pseudo phase matching wavelength conversion device by using a high electric field, a plurality of semiconductor materials cut and divided every coherence length 1c are used and are united with one another by diffused junction, so that the device can be formed. However, since it is difficult to completely unite the boundary surfaces by the diffused junction, especially in the case where the number of boundary surfaces is large, the loss due to the junction becomes large, and it is difficult to obtain a high output wavelength conversion beam.

Figure 3:
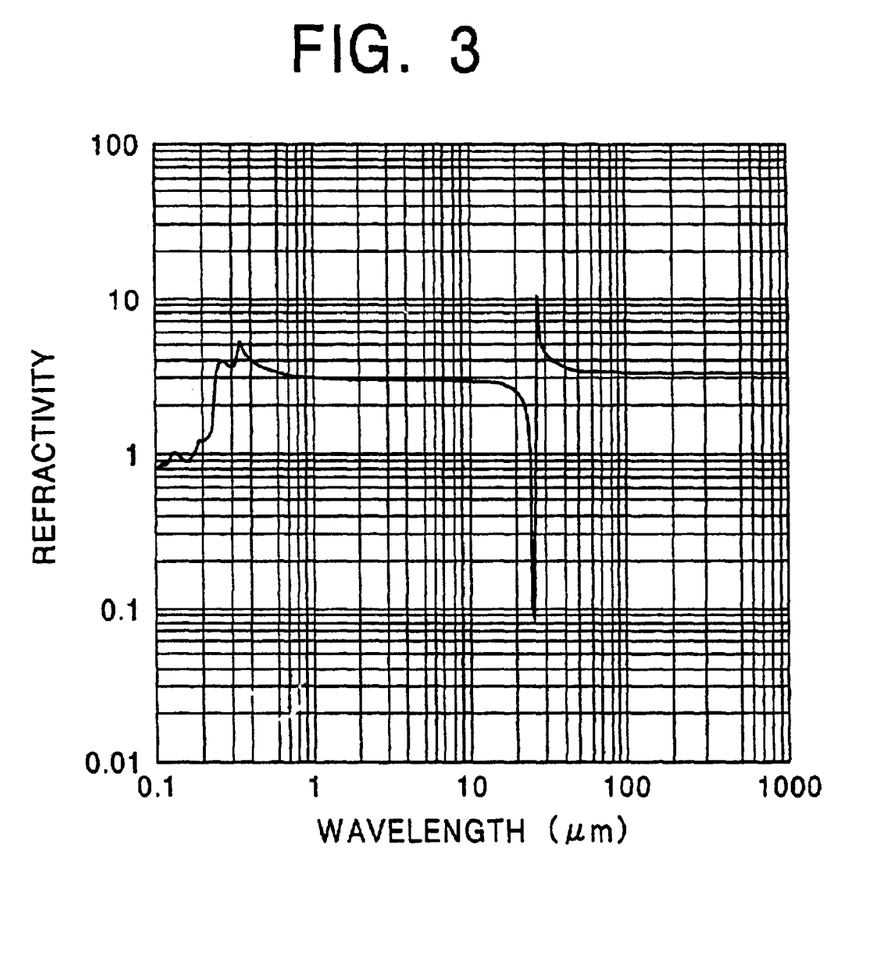
FIG. 3 is a view showing wavelength dependency of refractivity of GaP.

FIG. 3 is a characteristic view showing the wavelength dependency of refractivity of GaP.

The refractivity of GaP is monotonically decreased in the vicinity of the 1 μm band. Further, infrared abnormal dispersion exists in the 25 μm band. Because of such an abnormal dispersion characteristic, a long wavelength light is refracted more deeply than a short wavelength light, and further, the refractivity is gradually approached in the vicinity of terahertz and becomes almost constant.

In the case of the semiconductor material such as GaP or GaAs, in exciting beams of two wavelengths of the 1 μm band in which the difference frequency becomes on the order of terahertz, the wave number difference becomes almost coincident with the wave number of a terahertz beam.

Figure 4:
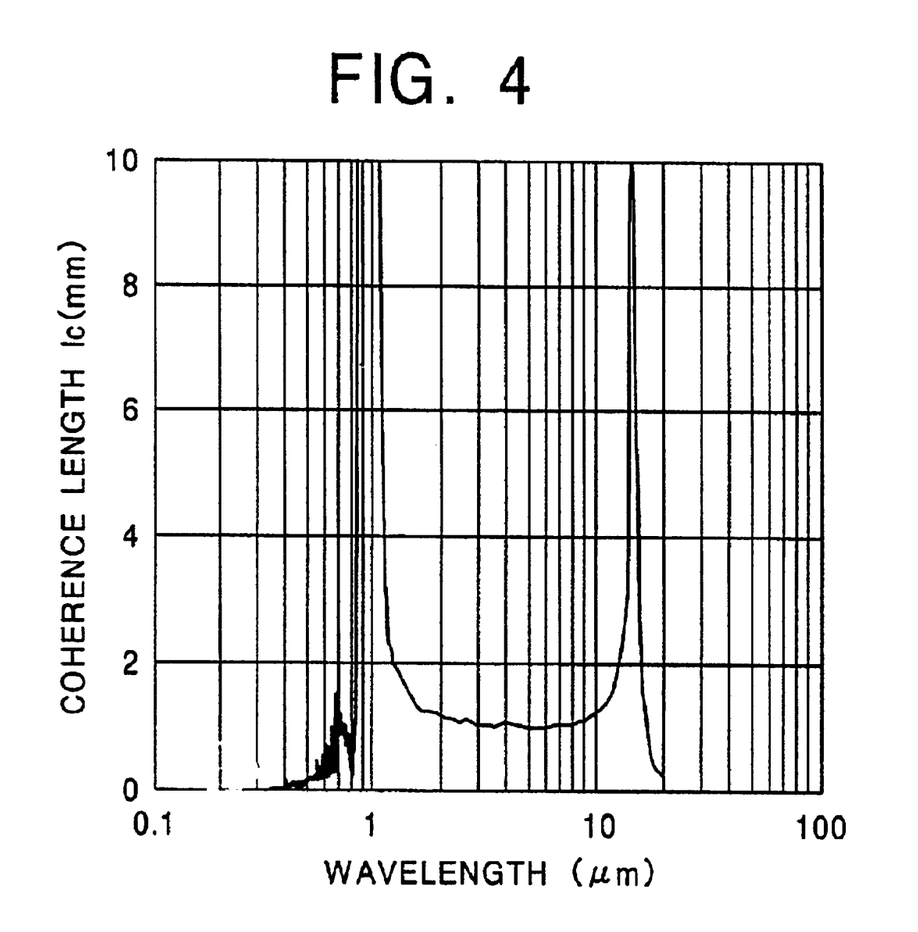
FIG. 4 is a view showing calculation result of coherence length.

FIG. 4 is a view showing the calculation result of the coherence length 1c when the wavelength of the difference frequency beam is λ3=300 μm.

Here, the horizontal axis indicates the wavelength λ1 of the excitation beam 1 and the vertical axis indicates the coherence length 1c. Δk becomes small and therefore it becomes possible to make the coherence length 1c as long as the order of mm in the case where a double wavelength laser in a 1 μm band is used as an excitation light source, a semiconductor material like GaP is used as a wavelength conversion device, and there is performed difference frequency generation in a terahertz wave band. Accordingly, it becomes possible to suppress the number of junction interfaces of the semiconductor pseudo phase matching device to a minimum level. This makes it possible to produce a low-loss device and to obtain high-output terahertz beam with a high degree of efficiency.

Since the semiconductor such as GaP or GaAs has a large nonlinear optical constant, it is suitable for high-efficiency wavelength conversion. Further, the pseudo phase matching wavelength conversion device has a construction where junction is formed so that the [001] axes are alternately inverted from one coherence length to another coherence length. Therefore, it is not required to set Δk as zero, so that it becomes possible to make the optical axis of double wavelength excitation beam coincident to the optical axis of difference frequency beam. Therefore, it becomes possible to obtain long interaction lengths of the double wavelength excitation beam and the difference frequency beam, which means that this technique is particularly suitable for the high-efficiency wavelength conversion.

In the difference frequency generation using the semiconductor pseudo phase matching device 2 and the exciting beams of the two wavelengths, since high efficiency wavelength conversion is especially enabled, the generation of the terahertz beam can be obtained at high efficiency and high output even if various pulse lengths from a continuous wave to a short pulse of picosecond or less are used for the exciting beams of the two wavelengths. Thus, by selecting the pulse lengths of the exciting beams of the two wavelengths, it is possible to obtain the terahertz beam of the difference frequency from the continuous wave to the short pulse of picosecond or less. Thus, it is not necessary that the terahertz beam is generated particularly in the short pulse of picosecond or less, the wavelength broadening of the terahertz beam determined by Fourier limit can be made narrow, and the terahertz beam of the single longitudinal mode can be obtained while the narrow line width characteristic is maintained.

Since the semiconductor such as GaP or GaAs is transparent in the terahertz region, the terahertz beam obtained by the difference frequency generation is not attenuated by absorption, and can be extracted as an output beam at high efficiency. Further, since the semiconductor such as GaP or GaAs has large thermal conductivity, it is also suitable for a high output operation.

Further, it is possible to provide a terahertz wave light source which can tune a terahertz generation wavelength over several hundred um by merely adjusting the device temperature and changing the wavelength of one of the difference frequency light sources slightly by the order of nm.

While in the above embodiment, although GaP is used as the nonlinear material, another semiconductor such as GaAs can be used since it has a similar abnormal dispersion characteristic.

Further while in the above embodiment, as the excitation laser light sources, although the Nd:YAG laser is used as the fixed wavelength laser and the Yb:YAG laser is used as the tunable wavelength laser, the invention can be realized even when two Yb:YAG lasers are used, and can also be applied to a case where another Nd-added laser or Yb-added laser is used.

Further, in the above embodiment, as the excitation light sources, although the Nd:YAG laser is used as the fixed wavelength laser and the Yb:YAG laser is used as the tunable wavelength laser, the invention can be realized even when a Nd:YLF laser is used as the fixed wavelength laser, and a Yb:YAG laser is used as the tunable wavelength laser, and further, the invention can also be applied to a case where another Nd-added laser or Yb-added laser is used.

As described above, since the present invention proposes, for the generation of a terahertz wave, a technique for making a junction interval for pseudo phase matching difference frequency generation a long period of several mm by using the tunable wavelength laser of the 1 μm band and the abnormal dispersion characteristic of the semiconductor having a large nonlinear optical constant and thermal conductivity, the high output and high efficiency terahertz wave generation can be easily and certainly realized while the narrow line width characteristic is maintained.

What is claimed is:

1. A solid-state light source apparatus, comprising:
   a first excitation laser light source for outputting a laser beam of a first wavelength;
   a second excitation laser light source for outputting a laser beam of a second wavelength, a difference frequency between the laser beam of the first wavelength and the laser beam of the second wavelength being in a terahertz band; and a nonlinear wavelength conversion device having a plurality of semiconductor materials united with each other by diffused junction, the nonlinear wavelength conversion device disposed at a place where a first optical axis of the laser beam of the first wavelength overlaps with a second optical axis of the laser beam of the second wavelength, and generates a terahertz beam in a direction coaxial with the first and second optical axes on the basis of irradiation of the laser beams of the first and second wavelengths.

2. A solid-state light source apparatus according to claim 1, wherein the first excitation laser light source is a fixed wavelength laser, and the second excitation laser light source is a tunable wavelength laser.

3. A solid-state light source apparatus according to claim 2, wherein the first excitation laser light source is a Nd:YAG laser, and the second excitation laser light source is a Yb:YAG laser.

4. A solid-state light source apparatus according to claim 3, wherein
the first excitation laser light source outputs a monochromatic beam of the first wavelength of 1.064 μm, and
the second excitation laser light source outputs a monochromatic beam of the second wavelength in a band of 1 μm.

5. A solid-state light source apparatus according to claim 1, wherein the first and second excitation laser light sources are Yb:YAG lasers.

6. A solid-state light source apparatus according to claim 1, wherein the first excitation laser light source is a Nd:YLF laser, and the second excitation laser light source is a Yb:YAG laser.

7. A solid-state light source apparatus according to claim 1, wherein the nonlinear wavelength conversion device is a semiconductor pseudo phase matching device comprising said plurality of semiconductor materials united with each other by diffused junction in which a plurality of first semiconductor materials of said plurality of semiconductor materials, each having a length of $\Lambda/2$ in a direction coaxial with the first and second optical axes and a plurality of second semiconductor materials of said plurality of semiconductor materials, each having a length of $\Lambda/2$ are united with one another by diffused junction, and the first and second semiconductor materials are disposed so that directions vertical to the first and second optical axes are [001] axes, directions of the respective [001] axes are parallel to one another, and the directions of the [001] axes are alternately inverted.

8. A solid-state light source apparatus according to claim 7, wherein the first and the second semiconductor materials of the semiconductor pseudo phase matching device are transparent materials in a terahertz region.

9. A solid-state light source apparatus according to claim 8, wherein the first and the second semiconductor materials of the semiconductor pseudo phase matching device are made of GaP.

10. A solid-state light source apparatus according to claim 8, wherein the first and the second semiconductor materials of the semiconductor pseudo phase matching device are made of GaAs.

11. A solid-state light source apparatus according to claim 1, wherein the nonlinear wavelength conversion device is a semiconductor pseudo phase matching device comprising said plurality of semiconductor materials united with each other by diffused junction in which a plurality of first semiconductor materials of said plurality of semiconductor materials, each having a length of $\Lambda/2$ in a direction coaxial with the first and second optical axes and a plurality of second semiconductor materials of said plurality of semiconductor materials, each having a length of $\Lambda/2$ are united with one another by diffused junction, and the first and second semiconductor materials are disposed so that azimuths of the first and second semiconductor materials are the same as a direction perpendicular to the first and second optical axes and directions thereof are alternately inverted.

12. A solid-state light source apparatus according to claim 11, wherein the first and second semiconductor materials of the semiconductor pseudo phase matching device are transparent materials in a terahertz region.

13. A solid-state light source apparatus according to claim 12, wherein the first and second semiconductor materials of the semiconductor pseudo phase matching device are GaP.

14. A solid-state light source apparatus according to claim 12, wherein the first and second semiconductor materials of the semiconductor pseudo phase matching device are GaAs.

15. A solid-state light source apparatus, comprising:
a first laser light source for outputting a first laser beam having a first wavelength;
a second laser light source for outputting a second laser beam having a second wavelength at a slight angle from the first laser beam;
a nonlinear wavelength conversion device having a plurality of semiconductor materials united with each other by diffused junction, the plurality of semiconductor materials having a length in a direction coaxial with the optical axes of the first and second laser beams, and having a polarization direction arranged in parallel and alternately inverted; and
an output beam generated from the nonlinear wavelength conversion device and corresponding to a difference frequency between the first laser beam and the second laser beam, the difference frequency in a terahertz band, wherein said output beam is coaxial with the direction of the plurality of semiconductor materials.

16. A solid-state light source apparatus according to claim 15, wherein the first wavelength of the first laser beam is shorter than the second wavelength of the second laser beam.

17. A solid-state light source apparatus according to claim 15, wherein the first wavelength of the first laser beam is longer than the second wavelength of the second laser beam.

* * * * *